United States Patent [19]

Trutter

[11] Patent Number: 4,684,175

[45] Date of Patent: * Aug. 4, 1987

[54] LOCKING DEVICE FOR A REAR SEAT BACK REST

[75] Inventor: Walter P. Trutter, Wiesbaden, Fed. Rep. of Germany

[73] Assignee: General Motors Corporation, Detroit, Mich.

[ * ] Notice: The portion of the term of this patent subsequent to Jan. 13, 2004 has been disclaimed.

[21] Appl. No.: 752,519

[22] Filed: Jul. 8, 1985

[30] Foreign Application Priority Data

Jul. 12, 1984 [DE] Fed. Rep. of Germany ....... 3425669

[51] Int. Cl.$^4$ .............................................. B60N 1/10
[52] U.S. Cl. .................................... 297/379; 292/227; 296/65 R
[58] Field of Search .................. 297/378, 379; 70/261; 292/227; 296/65 R

[56] References Cited

U.S. PATENT DOCUMENTS

| | | | |
|---|---|---|---|
| 1,185,422 | 5/1916 | Mammelli | 292/227 |
| 1,385,632 | 7/1921 | McNally | 292/227 |
| 3,767,244 | 10/1973 | Plaw | 292/227 |
| 4,475,763 | 10/1984 | Hamaani et al. | 297/378 X |
| 4,561,694 | 12/1985 | Mauri et al. | 297/355 X |

FOREIGN PATENT DOCUMENTS

| | | | |
|---|---|---|---|
| 29514 | 6/1958 | Finland | 292/227 |
| 418683 | 3/1947 | Italy | 292/227 |
| 729045 | 5/1955 | United Kingdom | 292/227 |

Primary Examiner—Kenneth J. Dorner
Assistant Examiner—Peter R. Brown
Attorney, Agent, or Firm—William A. Schuetz

[57] ABSTRACT

A locking arrangement for a seat back of a motor vehicle rear seat includes a tongue-shaped locking member which is fastened to a body component and provided with a recess. The latching device includes a plastic housing built into the seat back. The plastic housing accommodates a single-arm latch bar which is adapted to engage into the recess of the tongue-like locking member by way of a latch tab.

A slidable pin is mounted for axial displacement in a guide bore of the plastic housing and is seated with its one end on the latch bar. On its other end the slidable pin is provided with an actuating button which is embedded in a trough-like grip member. Upon pressing the actuating button, the latch bar is pivoted against the biasing force of a spring, and the latch tab is moved out of the recess of the tongue-shaped locking member, which will cause unlocking of the seat back.

3 Claims, 8 Drawing Figures

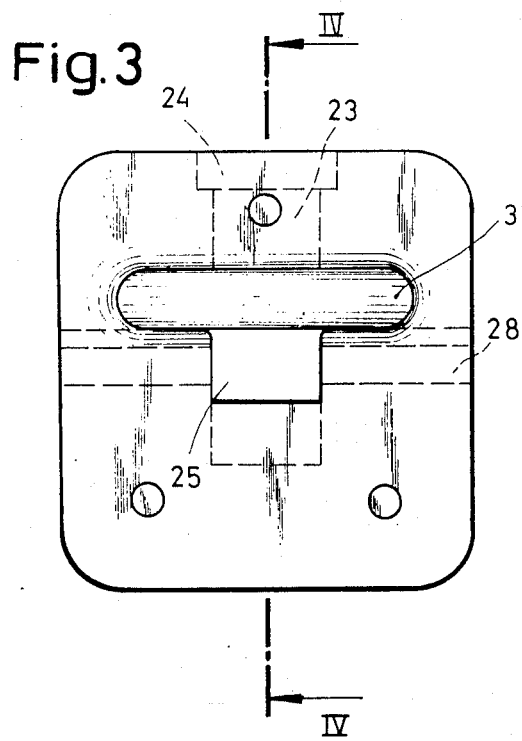
Fig. 3
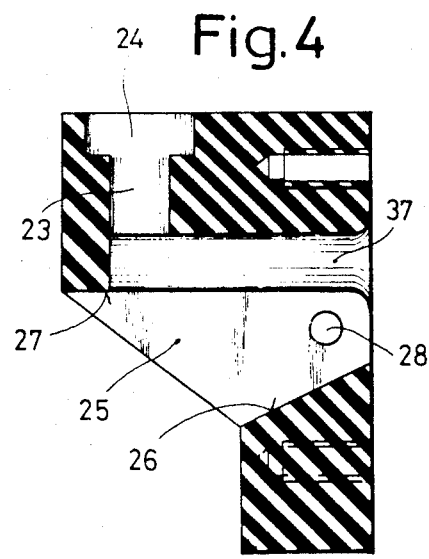
Fig. 4
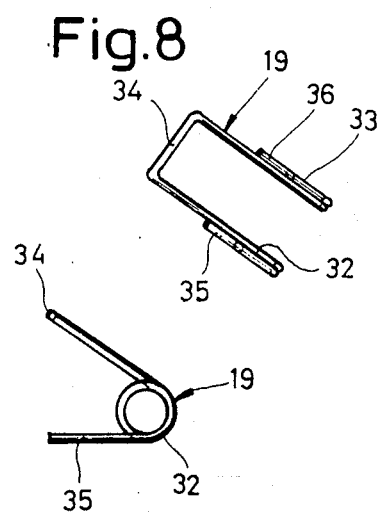
Fig. 8
Fig. 7
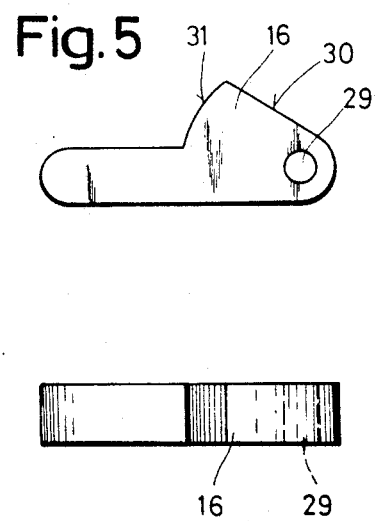
Fig. 5
Fig. 6

LOCKING DEVICE FOR A REAR SEAT BACK REST

The invention relates to a locking arrangement for the seat back of a motor vehicle rear seat assembly, including a latching device incorporating a latch member for locking the same to a locking member of a rearwardly disposed body portion. Locking devices of this type are currently employed in motor vehicles equipped with foldable rear seat assemblies and are generally known in the art.

Prior art locking arrangements oftentimes have a tendency to rattle and require relatively close manufacturing tolerances if reliable locking of the seat back is to be effected. A wide variety of locking arrangements for various purposes are known in the art, so that the expert should have no difficulty in adapting one or the other prior art locking arrangement to the seat back of a motor vehicle rear seat assembly. However, the requirements to be met in motor vehicles are often incompatible with one another. If priority is given to rattle-free and reliable operation, close attention must be paid to manufacturing tolerances, not only in regard to the individual locking components, but also the rear seat itself and the locking members to be attached to the vehicle body.

For instance, in the German patent DE-PS No. 2 365 250 there is disclosed a safety belt buckle in which a tongue provided with a recess is to be inserted into an arresting device having a single-arm latch bar. The latch bar is spring-biased in the locking direction and is adapted for pivoting movement by means of a push button in such a manner that a projecting portion of the locking lever is moved out of the recess.

However, safety belt buckles are not afflicted with the problems dominant in seat backs for rear seats, i.e., they are not subject to rattling. Furthermore, in the manufacture of safety belt buckles, only the parts that are locked to each other must have close tolerances, whereas in the case of seat backs for rear seat assemblies, dimensional accuracy must be extended to the seat back itself and the locking components to be secured to the vehicle body if proper functioning of the seat back lock is to be expected.

It is the object of the present invention to provide a locking arrangement of the type mentioned in the foregoing which is reliable in operation and not subject to rattling while the cooperating components of the locking arrangement may be manufactured at tolerances that are not very critical.

According to the present invention, this objective is met in that the striker member is in the form of a tongue which is provided with a recess, and the latch member is in the form of a single arm latch bar which is mounted in a plastic housing of the seat back of the rear seat assembly. The latch bar is provided with a latch tab for engagement with the recess, is spring-biased in the direction of the recess and is actuated by an axially displaceable pin. The displaceable actuating pin is in abutting relationship with the latch bar and is spaced apart from the pivoting axis of the latch bolt at a greater distance than the latch tab.

In the above-described locking arrangement as proposed by the present invention, neither the latching parts nor the seat back of the rear seat assembly or the striker parts require close manufacturing tolerances, and yet the operation of the locking arrangement is reliable and rattle-free. Furthermore, the locking arrangement according to the present invention is of relatively low weight and has a relatively long service life due to its simplicity of construction.

The manufacturing costs of the locking arrangement can be reduced considerably if the latch bar is made of plastics. In addition to the cost-saving factor, the use of plastics reduces the likelihood of rattling even further.

Preferably, the latch bar is mounted by way of a pin in a slot of the plastic housing. This arrangement will prevent the seat from becoming unlocked in the event of an accident.

An additional feature of the invention resides in an arrangement in which the actuating pin is adapted for axial displacement in a guide bore of the plastic housing. This arrangement will ensure that the actuating pin, regardless of the dimensional tolerances of the seat back of the rear seat assembly, will be properly located upon the latch bar and will thereby enable proper functioning of the locking arrangement.

Errors in alignment between the actuating pin with its control knob and the embedded grip body accommodating these two parts can be eliminated if the plastic housing is provided with an opening for insertion of the grip body into which the actuating pin with its control knob is extending.

Spring-biasing of the latch bar in the locking direction may be effected in a relatively simple manner in that the latch bar is urged in that direction by a hairpin spring which is encircling the pivot pin and which is arranged such that its one leg is bearing against the latch bar and its other leg against a retaining surface provided on the plastic housing.

According to another feature of the invention, the latch tab is provided with an engagement surface which is adapted to make the initial contact with the tongue-shaped striker when the seat back of the rear seat is folded down, and with an arcuate arresting surface that is arranged adjacent the engagement surface whose center of curvature is coinciding with the axis of the pivot pin of the latch bar. This arrangement will enable easy locking engagement when the seat back is moved into its fold-down position and will provide that the push button can be pressed down without effort when the seat back is to be unlocked.

The assembly operation of the locking arrangement may be greatly simplified if the latch bar is mounted for pivoting movement in the locking direction until it is bearing against a stop surface of the plastic housing, because this will enable the latch bar to be retained in a non-interfering position prior to the time the thrust pin and the latch body are added to the assembly.

It should be appreciated that a variety of arrangements may be utilized in the practice of the invention. One exemplary embodiment is illustrated in the drawings and in the following specification.

FIG. 3 is a view of the plastic housing of the locking arrangement according to FIGS. 1 and 2;

FIG. 4 is a section along line IV—IV through the latching arrangement of FIG. 3;

FIG. 5 is a view of the latch bar of the latching arrangement;

FIG. 6 is a top view of the latch bar according to FIG. 5;

FIG. 7 is a side elevation of a hairpin spring of the latching arrangement;

Figure 1:
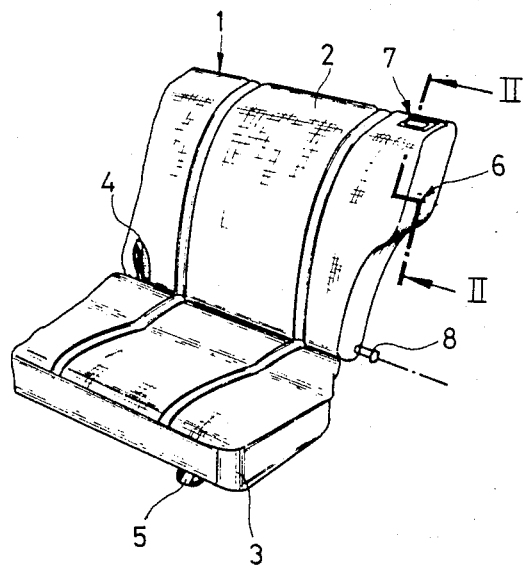
FIG. 1 is a three-dimensional view of a side portion of a motor vehicle rear seat assembly embodying the teachings of the invention.

FIG. 8 is the hairpin spring according to FIG. 7 as viewed at an angle from above. FIG. 1 illustrates the side portion of a rear seat assembly 1 which is comprised of a seat back 2 and a seat bottom 3. The seat bottom 3 is adapted to be lifted up by means of a loop-type handle 4 attached to the rear thereof and to be pivoted into a vertical position. For this purpose, hinges 5 are provided on the front of the seat bottom.

The dash-dotted lines in FIG. 1 represent a locking arrangement for the seat back of a rear seat which can be unlocked by means of an actuating device 7 built into the seat back of the rear seat. The unlocked seat can be knocked down forwardly through swinging movement about an axis 8.

Figure 2:
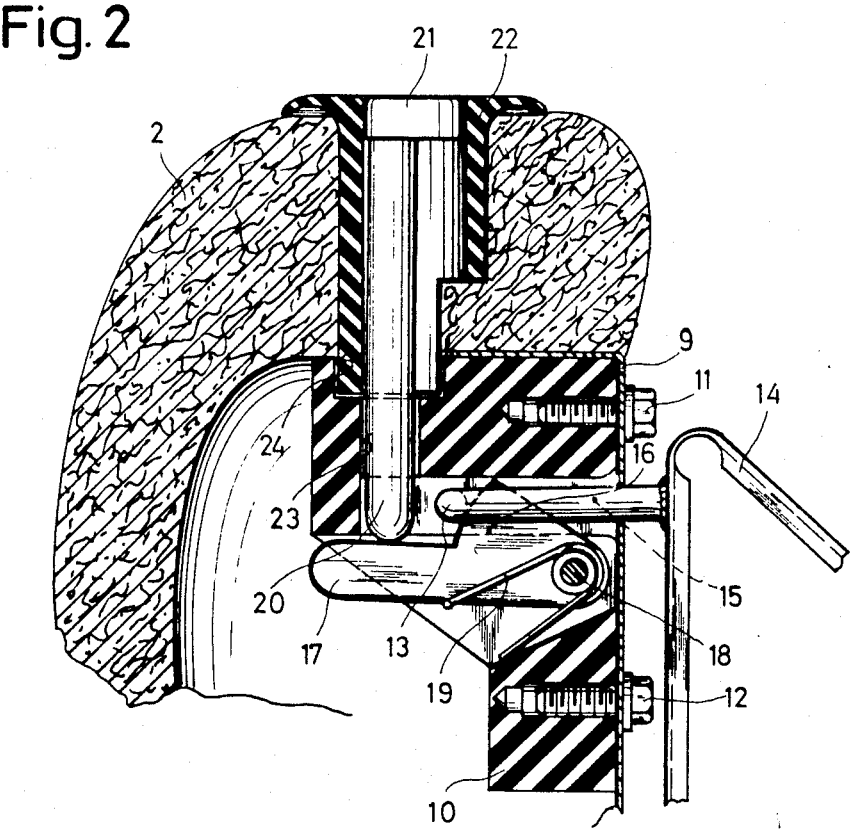
FIG. 2 is a section, on a greatly enlarged scale, along line II—II of FIG. 1.

FIG. 2 shows in greater detail the basic components employed in the locking arrangement according to the invention. One will notice again the seat back 2 of the rear seat assembly. The seat back 2 has a rear panel 9 which has a plastic housing 10 secured to its inner side by means of threaded bolts 11, 12. A tongue member 13, which is attached rearwardly of the rear panel 9, as for instance by welding, to a body component 14 is arranged so as to extend into the plastic housing 10. This tongue-like member 13 is provided, just like the tongue of a seatbelt buckle, with a recess 15 adapted to be engaged inside of the plastic housing 10 by a latch tab 16 of a latch bar 17 which will cause the seat back 2 of the rear seat assembly to be locked to the tongue-like member 13.

The latch bar 17 is mounted on a pin 18 inside the plastic housing 10 and is spring-biased by a hairpin spring 19 in the locking direction, i.e., clockwise as viewed in the drawing. A slidable pin 20, which is spaced apart from the pivot pin 18 at a greater distance than is the latch tab 16, is provided and arranged so as to bear against the latch bar 17. The slidable pin 20 has an actuating button 21 on its upper end which is accommodated inside a trough-like grip member 22. It is apparent from FIG. 2 that the slidable pin 20 is guided in a guide bore 23 of the plastic housing 10. The trough-like grip member 22, too, is retained by the plastic housing 10 as it is seated with its lower end inside a plug-in opening 24 formed in the plastic housing 10.

FIGS. 3 and 4 illustrate the plastic housing in greater detail. One will note in these figures a transversely and downwardly extending slot 25 which is defined on the bottom by a slanted stop surface 26 and which merges on the top into a considerably wider horizontal slot 27 which is designed to accommodate the tongue-like locking member 13. It should be noted, however, that the slot 27 does not extend through the entire plastic housing 10, so that the slot 25, too, is defined on the top by a stop surface 27 and by sides of side surfaces of the housing 10.

As shown in FIG. 2, the guide bore 23 also mentioned in the foregoing extends generally vertically and is terminating from above into the horizontal slot 27. One will also note in FIGS. 3 and 4 the plug-in opening 24 which extends coaxially of the guide bore 23 and which, like the guide bore, is of square cross-section. The pivot pin 18 for the latch bar is mounted in a horizontal bore 28 the sides of the housing 10 and extends transversely through the slot 25 in the plastic housing 10.

The latch bar 17 illustrated in FIGS. 5 and 6 is also provided with a bore designated by the numeral 29 so that it can be mounted on the pin 18. Its latch tab 16 is defined by a standard engagement surface 30 and an arcuate locking surface 31, with the center of curvature of the locking surface 31 coinciding with the center of the bore 29 and thus with the center of pin 18.

The hairpin spring 19 illustrated in FIGS. 7 and 8 has two coil portions 32, 33 with which it is trained about the pin 18. It also has a cross member 34 for connecting the two coil portions 32, 33 which engages the latch bar 34 from below, and a pair of leg ends 35, 36 which abut against the engagement surface 26.

The manner of operation of the subject locking arrangement is very simple. When the seat back 2 of the rear seat is swung from a horizontal position into an upright position, the tongue-like locking member 13 will become seated in the horizontal slot 37 and will be caused to engage with the engagement surface 30 of the latch bar 17. This will cause the latch bar 17 to be pivoted counterclockwise against the force of the hairpin spring 19. Once the seat back 2 has assumed its final upright position, the latch tab 16 will snap into the recess 15 of the tongue-like locking member 13 and will thus lock the seat back into position.

In order to fold the seat back 2 down, the actuating button 21 is pressed downwardly into the trough-like grip member 22. The slidable pin 20 will then cause the latch bar 17 to be pivoted counterclockwise, so that the latch tab 16 is being urged out of the recess 15, which will enable the seat back to be folded forwardly.

The embodiments of the invention in which an exclusive property or privilege is claimed are defined as follows:

1. A rear seat assembly for an automotive vehicle including a rear seat back rest which is pivotally supportable by body structure of the vehicle for movement between an upright position and a folded down position, and a releasable locking device carried by said seat back rest for engaging a generally horizontally disposed locking member on said vehicle body structure for automatically locking said back rest in its upright position when moved thereto, but which is manually releasable to permit said back rest to be unlocked from said locking member and be moved from its upright position toward its folded down position, the improvement being that said locking member comprises a tongue like member having a recess therethrough and that said locking device comprises a plastic housing secured to said back panel of said seat back rest adjacent its upper end, said housing having a transverse slot therethrough defined by sides and upper and lower surfaces of said housing which receives therein said locking member when the seat back rest is in its upright position, said housing having a generally vetically extending opening in communication with said slot adjacent its end remote from said back panel and which slidably receives a pin extending through the seat back rest at its upper end which can be manually depressed, a plastic locking lever mounted to a pivot pin means supported by the sides of said housing for rotation about its axis toward and away from said upper surface defining said slot, said lever having a first portion remote from said axis of rotation of said pivot pin means for engaging said slidable pin at its lower end and a second portion defining a transversely extending locking tab at a location spaced a lesser distance from said axis of rotation than said first portion, said second portion having an arcuate surface facing toward said pin which is concentric with said axis of rotation of said lever and a beveled surface facing toward said upper surface defining said slot, and spring means engageable with said housing and said lever for biasing said lever toward said top surface defining said slot and into engagement with said lower end of said pin means, said beveled surface of said second portion of said locking lever being engageable with said tongue like locking member to cause said lever to be pivoted away from the upper surface defining said slot as said seat is being moved toward its upright position until said second portion is aligned with said recess in said locking member whereupon said spring means moves said locking lever toward said upper surface and said arcuate surface into engagement with said locking member to both lock said backrest in its upright position and to prevent rattling between the back rest and said locking member, said pin being manually depressible to move said locking lever away from said upper surface to disengage said second portion thereof from said tongue like locking member to enable said back rest to be moved from its upright position toward its folded over position.

2. A rear seat assembly, as defined in claim 1, and wherein said top surface defining said slot serves as a stop for upward movement of said locking lever by said spring means.

3. A rear seat assembly, as defined in claim 2, and wherein said pin has a knob at its upper end which is larger than said opening in said plastic housing.

* * * * *